United States Patent
Sharangpani

[19]

[11] Patent Number: 6,108,772

[45] Date of Patent: *Aug. 22, 2000

[54] METHOD AND APPARATUS FOR SUPPORTING MULTIPLE FLOATING POINT PROCESSING MODELS

[75] Inventor: Harsh Sharangpani, Santa Clara, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/672,928

[22] Filed: Jun. 28, 1996

[51] Int. Cl.⁷ .................................................. G06F 15/177
[52] U.S. Cl. ..................... 712/221; 712/220; 708/500; 708/551; 708/552
[58] Field of Search ................... 395/376, 562, 395/561; 364/736.01, 745.02, 745.03, 748.03; 712/221, 220; 708/500, 551, 552, 572

[56] References Cited

U.S. PATENT DOCUMENTS

| | | | |
|---|---|---|---|
| 4,823,260 | 4/1989 | Imel et al. | 364/200 |
| 4,847,802 | 7/1989 | Ashton | 364/748 |
| 5,201,056 | 4/1993 | Daniel et al. | 395/800 |
| 5,307,301 | 4/1994 | Sweedler | 364/748 |
| 5,481,686 | 1/1996 | Dockser | 395/376 |
| 5,487,022 | 1/1996 | Simpson et al. | 364/715.04 |
| 5,673,407 | 9/1997 | Poland | 395/376 |

OTHER PUBLICATIONS

"IEEE Standard for Binary Floating–Point Arithmetic", *IEEE Standards Board*, STD 754–1985.

*Primary Examiner*—Zarni Maung
*Assistant Examiner*—Saleh Najjar
*Attorney, Agent, or Firm*—Charles A. Mirho

[57] ABSTRACT

A numerical processing method on a computer system in which an instruction having at least one operand and a type control is retrieved, and the operand is converted to a precision specified by the type control. The instruction is executed in the precision specified by the type control to obtain a result, and when the destination precision differs from the precision specified by the type control, the result is converted to the destination precision using a second instruction.

11 Claims, 2 Drawing Sheets

METHOD AND APPARATUS FOR SUPPORTING MULTIPLE FLOATING POINT PROCESSING MODELS

BACKGROUND

1. Field of the Invention

The invention relates to the field of processing floating point numbers in a computer system.

2. Art Background

Floating Point Formats:

Floating point numbers are typically represented in a computer system using a sign, an exponent, and a significand. The significand represents the number of bits of precision of the number. The exponent defines the range of the number, and is bounded by the values Emax (maximum exponent) and Emin (minimum exponent). The sign represents the sign of the number, either positive or negative. Using these three fields, floating point numbers are represented in the form $$(-1)^s 2^E (b_0.b_1 b_2 b_3.b_{p-1})$$

where:

s=the sign bit, 0 or 1

E=the exponent, any integer between Emin and Emax, inclusive bi=a significand bit, 0 or 1 p=number of significand bits (precision)

.=implied decimal point

A floating point number has p bits of precision in the significand field, $b_0.b_1 b_2 b_3.b_{p-1}$, which represent the number's significant digits. (The term 'significand' is analogous to the term 'mantissa' used to describe floating-point numbers on some conventional computers). The exponent field, E, locates the binary point within the significant digits (and therefore determines the number's magnitude). The term 'exponent' is analogous to the term 'characteristic' used to describe floating-point numbers on some conventional computers. The decimal point is not explicitly stored in the number, although its position is implied. Also, the significand bit b0 to the left of the decimal point may be implied as well. A 1-bit sign field, s, indicates whether the number is positive or negative. Negative numbers differ from positive numbers only in the sign bits of their significands.

For example, the number −260.00 can be represented as:
1 00001000 00000100000000000000000
where the sign bit is 1 (indicating a negative number), the exponent is 00001000 ($8_2$), and the significand is 1.00000100000000000000000, where the leading 1 and decimal point are implicit.

TABLE 1

|  | Single | Double | Extended |
|---|---|---|---|
| Total Format Width | 32 | 64 | 80 |
| p (bits of precision) | 23 | 53 | 64 |
| Exponent bits | 8 | 11 | 15 |
| Emax | +127 | +1023 | +16383 |
| Emin | −126 | −1022 | −16382 |
| Exponent Bias | +127 | +1023 | +16383 |

Table 1 describes the fields of each of three real-number formats; single, double, and extended.

The exponent determines a real number's magnitude. The exponent is typically stored in a biased form. A constant, called the bias, is added to the true exponent of the number to obtain a biased exponent. The bias is different for each real format. The bias is chosen so as to force the biased exponent to be a positive value. A number's true exponent can be determined simply by subtracting the bias value of its format from the exponent.

When a numeric value becomes very close to zero, normalized floating-point storage cannot be used to express the value accurately. A number R is said to be denormal when −2Emin<R<0 or 0<R<+2Emin. (For a typical case, Emin is −126 for single format, −1022 for double format, and −16382 for extended format.) In other words, a nonzero number is denormal if its exponent would be too negative to store in the destination format, while retaining the number in normalized form.

To accommodate denormal numbers, the processor can store and operate on real numbers that are not normalized, i.e., whose significands contain one or more leading zeros. Denormal numbers typically arise when the result of a calculation yields a value that is too small to represent in the destination format.

Denormal values have the following properties:

The biased floating-point exponent is stored at its smallest value. For single precision numbers, this minimum exponent value is −126. For double precision, the minimum exponent value is −1022. For the extended precision format, the minimum exponent value is −16382.

For all formats, when the number is denormal the minimum exponent is encoded with a bit pattern of all zeros.

The integer bit of the significand (whether explicit or implicit) is zero.

Interpretation of the exponent for denormal numbers differs from the interpretation of the exponent encoding for normalized numbers. For denormalized numbers, the exponent is encoded with the bit pattern of all zeros. However, this pattern is interpreted by the processor to have a value which is the minimum exponent value for the format (which is −126 for single format, −1022 for double real format, and −16382 for the extended real format). Hence, interpreting such denormal numbers by merely adding the bias of the format to the exponent encoding of the denormal number will produce an exponent value that is off by one. Denormals and true zeros both have exponents encoded with all zeros, although the interpretation of these encodings differ.

Numeric Computation Rules

To achieve consistent and reliable results from the computation, certain rules or conventions (relating to the operating precision and range of each computation) must be followed during numeric operations. Rules are defined for handling operands of mixed precision, and for the computation of intermediate values. IEEE standard 754-1985 allows for two important conventions for handling operands with mixed precisions, and for intermediate computations. These will be henceforth referred to as:

"Compute in Extended Precision"

"Compute In Destination Precision"

The detailed computation rules specified in the IEEE standard 754-1985 will not all be repeated here, and may be found in the official document. However, a short summary of the distinguishing characteristics is provided below.

Summary of the "Compute in Extended Precision" Convention

Under this convention, all intermediate values are computed to approximately infinite precision (commonly approximated by the extended precision format which must have at least 64 bits of precision) before entering into the final computation of the result. The result is then coerced to the destination format.

For example, consider the numerical operation:

$$A=B*C+D*E$$

where A, B, C, D, E are all defined to be double-precision values.

Let I1=B*C, let I2=D*E, and let I3=I1+I2

In the above example, all variables B, C, D, and E are first promoted to the extended precision format (no information is lost in promoting a variable to a wider format). Intermediate values I1 and I2 are calculated by performing the multiplications for B*C as well as for D*E in extended precision, so that I1 and I2 contain 64 bits of precision. The sum of I1 and I2 is also computed in extended precision to generate I3. Finally I3 is coerced to the double precision format by a rounding and precision conversion operation.

This convention is used by the floating point units and math coprocessors for the x86 family of processors manufactured by Intel™ Corp. The advantage of this convention is that intermediate values are computed with additional precision and range, which enhances the precision, reliability and integrity of the final result. The enhanced range on intermediate values often eliminates overflows and underflows that could have occured on the intermediate calculations but would not have been significant for the final result.

In an exemplary processor such as those manufactured by Intel Corp, the extended precision format contains 64 bits of precision, and the exponent range is 15 bits. The coercion of the intermediate value I3 from extended precision to the final result in the destination precision is performed by a store instruction, which also saves the final result to memory. This store instruction is complicated by the necessity to not only store the result to memory, but also convert to the destination precision, including rounding of the value and checking for overflow or underflow which may accompany the conversion, and possibly denormalizing the result to the destination format. The hardware for implementing the store instruction requires a rounding circuit, a range-checking and compression circuit, a denormalizer, as well as circuitry for actually transferring the value to memory. Thus considerable complexities must be incurred on the store path in order to deliver the benefits of computing in a wider precision.

2. Summary of the "Compute in Destination Precision" Convention

Under this convention, which is followed by many commercial Reduced Instruction Set (RISC) processors, all intermediate values are computed in the precision of the destination variable, rather than being computed in a wider format.

For example, consider again the numerical operation:

$$A=B*C+D*E$$

where A, B, C, D, E are all defined to be double-precision values.

Let I1=B*C, and let I2=D*E.

Using this convention, the intermediate results I1 and I2 are computed in double precision. The double-precision final result A is simply computed as I1+I2, without any additional rounding or conversion, because both intermediate values I1 and I2 are also double precision.

The advantage of this convention is that computations are typically faster and require less hardware to implement. Arithmetic involving 64 bit operands (extended) is typically slower than arithmetic involving 53 bit operands (double). Also, since intermediate values are computed in the final destination precision, no additional conversion and rounding operations must be executed to reach the destination precision, further improving the speed of the calculation.

The disadvantage of this method is the lost precision and range on intermediate values. This loss results in an accumulation of roundoff errors and the potential for additional overflows and underflows during intermediate calculations. Roundoff accumulation leads to a loss of integrity in the final result, and the overflows and underflows (when they occur) lead to reduced performance.

Improvements needed

It would be desireable to implement a processor which efficiently supports both IEEE conventions of numeric computation. Such a processor would have flexibility to execute numerical computations with the higher precision of the convert-to-extended-precision convention, and would also support the convert-to-destination-precision convention for potentially faster processing. Also, the processor should provide for a simple way to support the rounding and conversion of intermediate values to the destination format, and also a simple way to perform stores of final results to memory.

SUMMARY OF THE INVENTION

A numerical processing method on a computer system in which an instruction having at least one operand and a type control is retrieved, and the operand converted to a precision specified by the type control. The instruction is executed in the precision specified by the type control to obtain a result, and when the destination precision differs from the precision specified by the type control, the result is converted to the destination precision using a second instruction.

DETAILED DESCRIPTION

In the following description, numerous specific details are set forth such as specific formats and numbers of bits in numeric operands, in order to provide a thorough understanding of the present invention. In other instances, well-known structures and techniques have not been shown in detail because to do so would unnecessarily obscure the present invention.

The specific arrangements and methods described herein are merely illustrative of the principles of the present invention. Numerous modifications in form and detail may be made by those of ordinary skill in the art without departing from the scope of the present invention. For example, although the invention is exemplified using multipliers, numerous other arithmetic circuits could be substituted without departing from the scope of the invention; for example adders, subtractors, dividers, comparators, square root circuits, and circuits for converting from various integer formats to floating point could be used.

Overview of the Invention

Efficient compatibility with both IEEE conventions of numerical computation is achieved by adding type control to numerical operations and by using separate instructions to 1) convert results to the destination precision, and 2) store results to memory. The convert instruction changes the precision of a value in a register according to the type control and leaves the value with the new precision in the register. The store instruction does not change the precision of a value, but merely moves the value from a register to memory according to the type control. Furthermore, because a special format is used to store values in the register file, it is not necessary for either the convert instruction or the store instruction to normalize values in the register file.

In one embodiment, the type control is applied to the following instructions:
FADD—floating point addition
FSUB—floating point subtraction
FMUL—floating point multiplication
FDIV—floating point division
FSQRT—floating point square root
FCMP—floating point compare
FCONV—change floating point precision
FFLOAT—convert integer value to floating point
FFLOATU—convert unsigned integer value to floating point
FSTORE—store floating point value to memory
In alternate embodiments, the type control may be applied to other, additional, or fewer instructions without departing from the scope of the invention.

In one embodiment, the type control is two bits which are added to the instruction opcode. The two bits may be contiguous in the opcode or separated by one or more bit positions. For the instructions FADD, FSUB, FMUL, FDIV, FSQRT, and FCMP, the type control applies to the source operands for the instruction. For the instructions FADD, FSUB, FMUL, FDIV, and FSQRT, the type control also applies to the destination operand. For the instructions FCONV, FFLOAT, FFLOATU and FSTORE, the type control applies only to the destination operand. Some instructions may perform a precision conversion on one or more operands. For example, the FFLOAT instruction converts a value from the integer format to a floating point format with the precision specified by the type control. The FFLOATU instruction operates similarly on unsigned integer values, converting them to floating point format in the specified precision.

| Type Control | Interpretation |
|---|---|
| 00 | Single |
| 01 | Double |
| 10 | Extended |
| 11 | Unused |

The table above shows one interpretation of the type control in a floating point instruction, although of course the invention is not limited to the specific encodings in the table.

The Register File Format

During the loading of operands from memory into a register file, the operands are converted to the register file format, which in one embodiment comprises 80 bits. Both normal and denormal results originating from the single, double, and extended formats are converted to the 80-bit format in the register file. The first step in converting the numbers is setting the sign bit of the number in the register file to the sign bit of the floating point number. After setting the sign bit, the next step is setting the significand bits of the number in the register file to the significand bits of the floating point number. In one embodiment, for single precision numbers, the significand is taken from bit positions 0 through 22 and padded with zeros. For double precision numbers, the significand is taken from bit positions 0 through 51 and padded with zeros, and for extended precision numbers the significand is taken from bit positions 0 through 63.

If the exponent of the number is encoded as zero, then the explicit integer bit of the number in the register file is set to zero. An exponent encoded as zero is indicative of either a denormal number, or a true zero. Otherwise the explicit integer bit is set to one. If the number is normal, the exponent of the number in the register file is set to equal the sum of (1) the unbiased exponent of the number, and (2) the exponent bias of the register file. If the number is denormal, then the exponent of the number in the register file is set to the sum of (1) the minimum exponent value for the originating format, and (2) the exponent bias of the value in the register file.

When the minimum exponent of the originating format is −126 (single precision format), and the bias of the value in register file is +16383, the value 0x3f81 is selected for denormal single precision numbers (16383d−126d=0x3f81). For double precision denormal numbers, the value 0x3c01 is selected for the exponent of the value in the register file. The exponent of denormal numbers is encoded as zero; however, the value of the exponent for denormal numbers is interpreted by the processor to be the minimum exponent value for that format. Therefor, merely adding the unbiased exponent of the denormal number to the exponent bias of the value in the register file will not form an accurate exponent for the register file. Instead, the minimum unbiased exponent value of the originating format must be added to the exponent bias of the value in the register file to generate a correct exponent value.

Note that the exception will not be generated in situations where the conversion results in a subnormal number (unless the subnormal exception is masked). No exception is generated because the 80-bit register file format is designed to support the storing of single, double, and extended subnormal numbers. Thus, when storing numbers from the register file to a single or double precision memory location, it is unnecessary to perform denormalization on the number. This simplifies the store path considerably.

EXAMPLE

Multiplying Two Double-Precision Numbers Using the Convert-to-Destination-Precision Convention Consider an example in which two double precision numbers are multiplied to yield a double precision result.

$A(dbl)=B(dbl)*C(dbl)$

TABLE 2

| FLOAD B | Value B (a double-precision number) is loaded from memory into the register file and converted to the 80 bit register file format |
|---|---|

TABLE 2-continued

| | |
|---|---|
| FLOAD C | Value C (a double-precision number) is loaded into the register file and converted to the 80 bit register file format |
| FMUL B,C, R1; TC = dbl | Product B*C is computed in double-precision and stored in the register R1 in the 80 bit register file format. |
| FSTORE R1, A; TC = dbl | The product in R1 is stored to memory in double precision. |

Table 2 shows an example of the numerical operations executed using the convert-to-destination-precision convention. The type control of the FMUL instruction is set to double, so that the multiplication of B and C is performed in double precision. The FMUL instruction is typically generated by a program compiler, which converts high-level language statements (such as C language statements) into the assembly-level instructions which are executed by the processor. The compiler determines the type control of an instruction. For example, if the compiler determines that a multiplication of two numbers should be performed in double precision, the compiler will generate an FMUL instruction with the type control set to double.

Any double precision overflows or underflows resulting from the multiplication are detected by the hardware when the product of B and C is computed, and an exception will occur. An exception may also occur when the instruction uses operands which are incompatible with the type control of the instruction. For example, in an FMUL instruction with a type control set to double, if operand B is double precision and operand C is extended precision, then IEEE Standard 754-1985 requires that all operands be promoted to the precision of the widest operand (the extended precision of operand C in this case). However, it is an error to convert B to extended precision and perform extended precision arithmetic when the type control is double, because al operations must be performed in the precision specified by the type control (double).

Storing the Result to Memory

The product of B and C is stored in register R1 in the 80 bit register file format. Because it was computed in double precision, the product in R1 contains only 53 bits of precision. Next, the product is stored from the register R1 to memory. The type control of the FSTORE instruction is double precision, and so the product is stored in double precision to the memory location associated with the variable A. The store operation is simple and fast, because no range checking need be performed on the store and no rounding circuit is needed on the store path. Further, the store instruction is not required to normalize the value being stored. The value in the 80 bit register already has the precision of the destination in memory, so that the store instruction just moves selected bits from the register to memory with no rounding required. Denormal numbers are stored in a denormalized form.

EXAMPLE

Multiplying Two Double-Precision Numbers Using the Convert-to-Extended-Precision Convention Consider again the same example in which two double precision numbers are multiplied to yield a double precision result.

$A(dbl)=B(dbl)*C(dbl)$

TABLE 3

| | |
|---|---|
| FLOAD B | Value B (a double-precision number) is loaded into the register file and converted to the 80 bit register file format |
| FLOAD C | Value C (a double-precision number) is loaded into the register file and converted to the 80 bit register file format |
| FMUL B,C, R1; TC = ext | Product B*C is computed by first promoting B and C to extended precision, multiplying the numbers in extended precision, and storing the result in register R1 in the 80 bit register file format. |
| FCONV R1; TC = dbl | The extended precision product in R1 is converted to double precision, thought still retained in the 80 bit register file format. |
| FSTORE R1, A; TC = dbl | The double precision product in R1 is stored to memory in double precision. |

Table 3 shows an example of the numerical operations executed for the example using the convert-to-extended-precision convention. The type control of the FMUL instruction is set to extended, so that the multiplication of B and C is performed in extended precision. Both B and C are promoted to extended precision before performing the multiplication, which is also done in extended precision. The product of B and C is stored in register R1 in the 80 bit format, using extended precision (i.e. a 64 bit mantissa). Using the FCONV instruction with the type control set to double, the product in R1 is converted from extended precision to double precision and retained in the 80 bit format in the register file. Any double precision overflows or underflows are detected at this time. Next, the product in R1 is stored from the register R1 to memory. The type control of the FSTORE instruction is double precision, and so the product is stored in double precision in the memory location associated with the variable A.

The FCONV instruction does 3 things: 1) precision conversion, 2) range compression, and 3) checking for overflow and underflow resulting from the conversion. The FSTORE instruction is not required to perform range compression, because FCONV does the range compression when the precision of the result in register R1 is converted in-place. When converting from higher to lower precision, FCONV must also perform rounding. Rounding is performed according to the current settings of the rounding control; for example, round toward zero, round toward infinity, or round toward negative infinity.

In both the convert-to-destination-precision and the convert-to-extended-precision conventions, intermediate results in the register file are kept in 80 bit format until they are stored to memory. In the convert-to-destination-precision convention, range compression is performed by the arithmetic instruction (FMUL in the example). In the convert-to-extended-precision convention, range checking is also performed by the FCONV instruction. In the convert-to-destination-precision convention, four instructions (including the loading of operands) are required for the numerical operation; five instructions are required in the convert-to-extended-precision convention. The convert-to-destination-precision convention thus demonstrates a likely performance advantage, but at the potential cost of some precision in the calculation.

The same store instruction (FSTORE) is used in both the convert-to-destination-precision convention and the convert-to-extended-precision convention. Using either convention, the store instruction is simple and fast, because no range checking need be performed on the store, no rounding circuit is needed on the store path, and the store instruction is not required to normalize the value being stored.

Another advantage of the invention is that FCONV writes the converted value back to the register file (in-place conversion). A program is no longer required to write the value to memory and load it back into the register file again in order to convert from one precision to another.

Implementation

To implement the convert-to-destination-precision convention, the processor may employ several arithmetic circuits for the same operation. For example, the processor may implement one multiplier for single precision operations, one for double precision operations, and one for extended precision operations. The multiplier corresponding to the operand with the greatest precision is used for intermediate calculations and computing the final result. In one embodiment, one or more of the single, double, and extended precision circuits are combined by efficiently overlapping certain common gate structures and pathways. However, the overlap should be accomplished in a way that preserves the performance advantage of the lower-precision circuits.

For a numerical operation in convert-to-extended-precision convention, the extended precision circuit is used for intermediate calculations and computing the final result.

Figure 1:
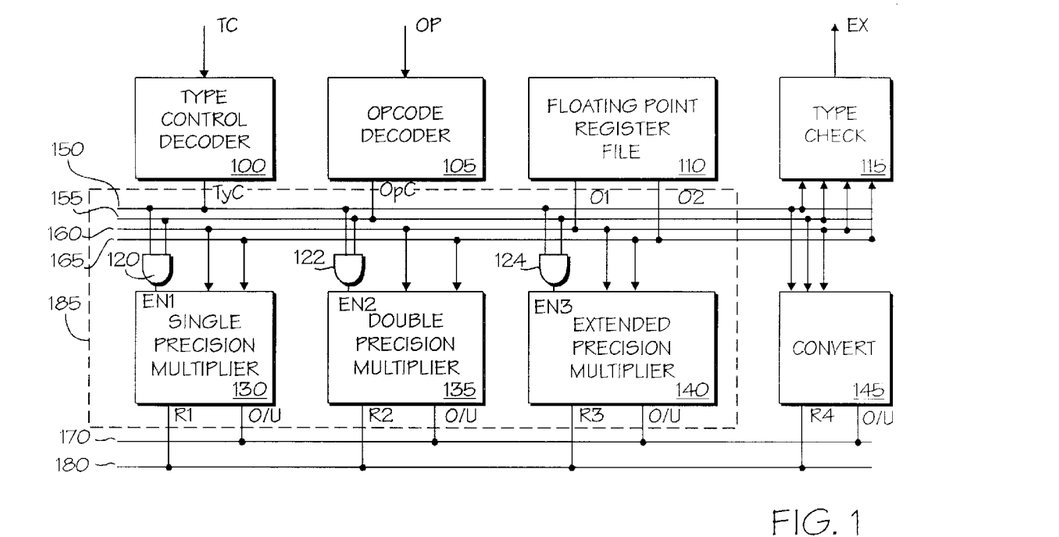
FIG. 1. shows a circuit for performing numerical operations in a one of a plurality of precisions, in a manner which is compatible with both the convert-to-destination-precision convention and the convert-to-extended-precision convention.

FIG. 1 shows a circuit for performing numerical operations in a one of a plurality of precisions, in a manner which is compatible with both convert-to-destination-precision convention and convert-to-extended-precision convention. The circuit is comprised of a type control decoder 100, an opcode decoder 105, a register file 110, a type checker 115, a plurality of multipliers 130, 135, 140, and an adder/converter 145. One or more of the single, double, and extended precision multipliers 130, 135, 140 may be combined by efficiently overlapping certain common gate structures and pathways. This combination is denoted by the dotted line 185. The combination should be accomplished in a way that preserves the performance advantage of the lower-precision circuits. The circuit also comprises several busses 150, 155, 160, 165, 170, 180 and several AND gates 120, 122, 124. Of course, the circuit contains additional circuitry not shown so as not to obscure the present invention. The type control TC is input to the type control decoder 100. The type control decoder 100 decodes the type control TC into an indication of the precision in which the numerical operation should be carried out. The outputs of the type control decoder 100, representing an indication TyC of the precision to use for the numerical operation, are coupled to the type control bus 150.

The opcode OP is input to the opcode decoder 105. The opcode decoder 105 decodes the opcode OP into an indication of the numerical operation the circuit will perform (for example, multiply, add, or convert). The outputs of the opcode decoder 105, representing an indication OpC of the numerical operation to perform, are coupled to the operation bus 155.

The register file 110 stores operands O1 and O2. The outputs of the register file 110 containing the operands O1 and O2 of the numerical operation are coupled to the operand busses 160 and 165. The precision type indication TyC from type control bus 150, the operation indication OpC from operation bus 155, and the operands O1 and O2 from the operand busses 160, 165 are input to the type check circuit 115. The type check circuit 115 evaluates the operands O1 and O2 for any incompatibilities with the operation indication OpC and the precision type TyC. If there is an incompatibility, the type check circuit 115 outputs an exception EX. If the precision indication TyC indicates a single precision operation, and the operation indication OpC indicates multiply, the AND gate 120 asserts its output which enables the single precision multiplier 130 by way of the enable input EN1.

The single precision multiplier 130 receives the operands O1 and O2 from the operand busses 160, 165. When enable signal EN1 is asserted, the single precision multiplier 130 performs a single precision multiplication of the operands O1 and O2, and outputs either a single precision result R1 to result bus 180, or else outputs an overflow/underflow indication O/U to exception bus 170 if the multiplication produced a single precision overflow or underflow.

If precision indication TyC indicates a double-precision numerical operation and operation indication OpC indicates multiply, the AND gate 122 asserts its output which enables the double precision multiplier 135 by way of enable input EN2. The double precision multiplier 135 receives the operands O1 and O2 from the operand busses 160 and 165. When enable signal EN2 is asserted, the double precision multiplier 135 performs a double precision multiplication of the operands O1 and O2 and outputs a double precision result R2 to result bus 180, or else an overflow/underflow indication O/U to exception bus 170 when the multiplication produced a double precision overflow or underflow.

If the precision indication TyC indicates extended precision for the numerical operation and the operation indication OpC indicates multiply, the AND gate 124 asserts its output which enables the extended precision multiplier 140 by way of enable input EN3. The extended precision multiplier 140 receives the operands O1 and O2 from the operand busses 160 and 165. When enable signal EN3 is asserted, the extended precision multiplier 140 performs an extended precision multiplication of the operands O1 and O2 and outputs an extended precision result R3 to result bus 180, or else an overflow/underflow indication O/U to exception bus 170 when the multiplication produced an extended precision overflow or underflow.

The converter 145 receives the operand O1, the operation indication OpC, and the precision indication TyC from operand bus 160, operation bus 155, and type control bus 150, respectively. When the operation OpC indicates a conversion, the converter 145 converts the operand O1 according to the precision indication TyC and outputs the converted result R4 to the result bus 180, or else it outputs an overflow/underflow indication O/U to the exception bus 170.

Figure 2:
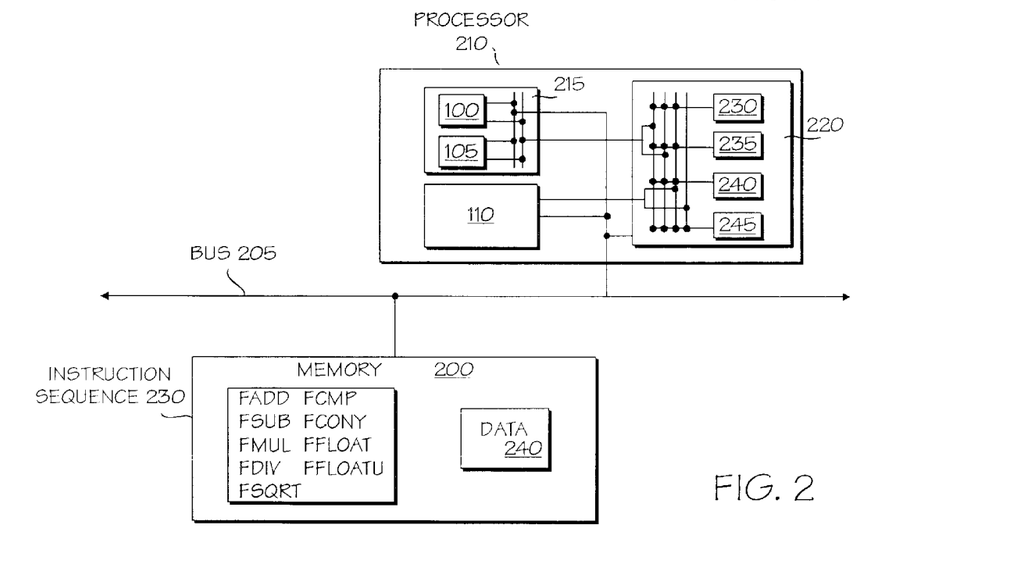
FIG. 2. illustrates a computer system utilizing a circuit for performing a numerical operation in one of a pluraliy of precisions, in a manner compatible with both the convert-to-destination-precision convention and the convert-to-extended-precision convention.

FIG. 2 illustrates a computer system utilizing a circuit for performing a numerical operation in one of a plurality of precisions, in a manner compatible with both the convert-to-destination-precision convention and the convert-to-extended-precision convention. In FIG. 2, a memory 200 represents one or more storage areas for storing instructions and data. For example, the memory 200 may include machine-readable mediums such as read only memory (ROM), random access memory (RAM), magnetic disk storage mediums, optical storage mediums, flash memory devices, and/or other machine-readable mediums. The memory 200 is coupled to a processor 210 by way of a bus 205. The bus 205 represents one or more busses (e.g., PCI, ISA, X-Bus, EISA, VESA, optical coupling, etc.) and bridges (also termed as bus controllers). The processor 210 represents a central processing unit of any type of architecture, such as CISC, RISC, VLIW, or a hybrid architecture. In addition, the processor 210 could be implemented on one or more chips. Using the bus 205, the processor 210 accesses the various elements stored in the memory 200.

The processor 210 contains a decoder 215 for decoding the instructions, a register file 110 for storing the operands and results of executing the instructions, and an execution unit 220 for executing instructions. Of course, the processor 210 contains additional circuitry which is not necessary to understanding the invention. The decoder 215 is coupled to the bus 205, and the register file 110 is coupled to the decoder 215. The execution unit 220 is coupled to decoder 215 and the register file 110. The operands of instructions decoded by the decoder 215 are made available to the execution unit 220 by placing them in the register file 110. The register file 110 contains data registers to store arguments for the received instructions. The register file 110 may contain status registers, control registers, and address registers for controlling the execution of the recieved instructions. The decoder may be implemented using hard-wired circuitry, a Programmable-Gate-Array, a microcoded ROM, or by any other method known in the art. While this embodiment is described in relation to a single processor computer system, the invention could be implemented in a multi-processor computer system.

The instruction decoder 215 is comprised of a type control decoder 100 and an opcode decoder 105. Of course, the instruction decoder 215 contains additional circuitry not shown so as not to obscure the present invention. The execution unit 220 is comprised of arithmetic circuits 232, 235, 240, and 245 for performing numerical operations in a plurality of precisions. Of course, the execution unit 220 contains additional circuitry not shown so as not to obscure the present invention. The processor 210 transfers the instructions 230 over the bus 205 to the instruction decoder 215 where they are decoded to determine their opcodes, operands, and other characteristics. Operands for the instructions 230 may be included in the instructions 230 (immediate operands), or they may be located in the data 240 in memory 200 in which case the processor 210 transfers the data 240 to the register file 110. The decoded instructions are executed on the operands by the execution unit 220.

Within the instruction decoder 215 the type control and opcode are decoded by type control decoder 100 and opcode decoder 105 respectively.

The execution unit 220 accesses the decoded opcode and type control, and the operands in the register file 110, and executes the numerical operation selected by the decoded opcode on the operands in the precision selected by the decoded type control. The results are output to the register file 110 or are stored back to memory 200 using a store instruction. For results which are not in the precision stored back to memory 200, there is no need for the store instruction to convert the precision 110.

The invention simplifies the implementation of the store instruction by removing the requirement to have a rounding circuit to convert the precision of the value being stored to the destination precision, and thus removing the requirement for range compression when values from the register file 110 are stored to memory 200. Also, the use of the 80-bit format in the register file eliminates the need for the storing circuit to normalize the result when saving to memory 200, eliminating the possibility of normalizing exceptions. Note that although the circuits have been shown using multipliers 130, 135, and 140, other arithmetic circuits could be substituted without departing from the scope of the invention. For example, adder circuits, subtraction circuits, division circuits, square root circuits, and comparator circuits may be substituted without departing from the scope of the invention. Arithmetic circuits which require only a single operand (such as a square root circuit) will not input both operands O1 and O2, but rather will input only a single one of the two.

In another embodiment, the type control decoder 100 and the opcode decoder 105 need not reside within the instruction decoder 215, but could instead be an integrated part of the execution unit 220.

Although one embodiment of the invention uses a RAM Random Access Memory (RAM)for memory 200, other types of memory could be used without departing from the scope of the invention. For example, a RAM, a ROM, a flash memory, a cache memory, a hard disk, or any other volatile or non-volatile computer memory could be used.

Figure 3:
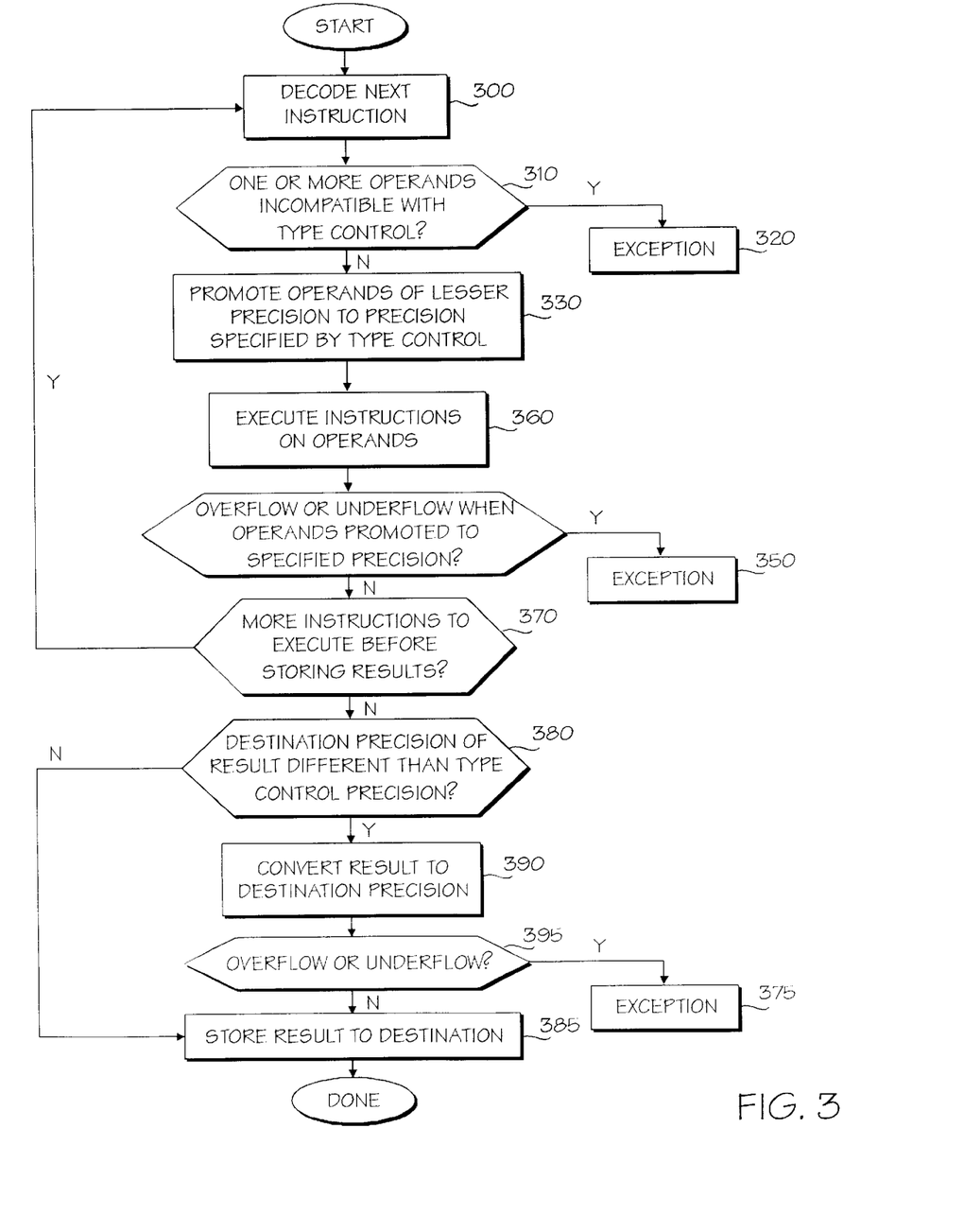
FIG. 3. illustrates a method for supporting numeric processing in both the convert-to-destination-precision convention and the convert-to-extended-precision convention in a manner which retains the performance advantage of the convert-to-destination-precision convention and the precision advantage of the convert-to-extended-precision convention.

FIG. 3 illustrates a method for supporting numeric processing in both convert-to-destination-precision convention and convert-to-extended-precision convention in a manner which retains the performance advantage of the convert-to-destination-precision convention and the precision advantage of the convert-to-extended-precision convention. At step 300 the next instruction in a sequence of one or more instructions for numerical processing is decoded. At step 310 a test is made to determine if one or more operands of the instruction have a precision which is incompatible with the precision specified by the type control. If none of the operands of the instruction have a precision which is incompatible with the precision specified by the type control, operands with less precision than the precision specified by the type control are promoted (converted up) to the precision specified by the type control at step 330. If one or more operands has a precision which is incompatible with the type control, an exception is taken at step 320.

The instruction is executed on the operands at step 360. If an overflow or underflow occured when one or more operands were promoted to the precision specified by the type control, an exception is taken at step 350. At step 370 a test is made to determine whether there are more instructions to execute before storing the result of the numerical operation. If there are no more instructions to execute before storing the result of the numeric operation, a test is made to determine whether the destination precision of the result is different than the precision specified by the type control at step 380. If there are more instructions in the numerical operation to execute before storing the result to memory, the next instruction is decoded at step 300.

If the destination precision is not different than the precision specified by the type control, the result is stored to the destination without converting the precision at step 385. If the destination precision is different than the precision specified by the type control, the result is converted to the destination precision at step 390. At step 395 a test is made to determine if an overflow or underflow has occured after converting the result to the destination precision. If the conversion of the result to the destination precision did not produce an overflow or an underflow, the result is stored to the destination location in memory at step 385. If converting the result to the destination precision produced an overflow or an underflow, an exception is taken at step 375.

Although this invention has been shown in relation to a particular embodiment, it should not be considered so limited. Rather, the invention is limited only by the scope of the appended claims. converting the result to the destination precision produced an overflow or an underflow,

What is claimed is:

1. A numerical processing method on a computer system, the method comprising:

retrieving a first floating point arithmetic instruction, the first floating point arithmetic instruction having at least one operand and a first type control;

converting the at least one operand to a precision specified by the first type control;

executing the first floating point arithmetic instruction in a precision specified by the first type control to obtain a result;

receiving a second floating point instruction, said second floating point instruction having a second type control;

converting the result to a destination precision using said second type control in said second instruction when the destination precision differs from the precision specified by the first type control; and storing the result to a memory location using a third floating point instruction without the third floating point instruction converting the precision of the result to the precision of the memory location.

2. The method of claim 1 wherein the first type control of the first arithmetic floating point instruction specifies one of a single, double, or extended precision.

3. The method of claim 1 wherein converting the result to a destination precision further comprises determining whether an overflow or an underflow has occurred during conversion of the result to the destination precision.

4. The method of claim 1 wherein executing the first floating point arithmetic instruction further comprises determining whether an overflow or an underflow has occurred when converting the operands to the precision specified by the first type control.

5. The method of claim 1 wherein converting the result to a destination precision does not require a normalization of the result.

6. The method of claim 1 wherein storing the result to a memory location does not require a normalization of the result.

7. The method of claim 1 wherein said memory location is within a random access memory, a cache memory, or a flash memory.

8. An apparatus for use in a computer system comprising:

a storage area containing a first floating point instruction defining a numeric operation and one of a plurality of precisions for the floating point numerical operation, the storage area storing at least one operand for the first floating point instruction; and a processor coupled to said storage area, said processor configured to perform the floating point numeric operation defined by the first floating point instruction in the one of a plurality of a precisions defined by the first-floating point instruction by converting at least one operand into said one precision using one of a plurality of arithmetic circuits corresponding to the one of a plurality of a precisions, said processor outputting a numeric result of performing the floating point numerical operation, said processor further configured to convert said numeric result to a destination precision defined by a second floating point instruction when the destination precision differs from the precision specified by the first floating point instruction.

9. A processor for use in a computer system comprising:

storage means containing a first floating point instruction defining a floating point numeric operation and one of a plurality of precisions for the floating point numerical operation, the storage means storing at least one operand for the instruction; and processing means coupled to said storage means, said processing means configured for performing the floating point numeric operation defined by the first floating point instruction in the one of a plurality of a precisions defined by the first floating point instruction by converting at least one operand into said one precision using one of a plurality of arithmetic processing means corresponding to the one of a plurality of a precisions, said processing means further configured to convert a numeric result to a destination precision defined by a second floating point instruction when the destination precision differs from the precision specified by the first floating point instruction.

10. A computer system comprising:

a storage area having stored therein a first floating point instruction and at least one numeric operand, the first floating point instruction specifying a floating point numeric operation and one of a plurality of precisions for the floating point numeric operation;

a bus coupled to said storage area; and a processor coupled to said bus, said processor generating a floating point numeric result by performing the floating point numeric operation specified by the first floating point instruction on the at least one numeric operand by converting at least one operand into said one precision using an arithmetic processing means corresponding to the one of a plurality of precisions for the floating point numeric operation specified by the first floating point instruction, said processor further configured to convert said numeric result to a destination precision defined by a second floating point instruction when the destination precision differs from the precision specified by the first floating point instruction.

11. A computer system comprising:

storage means having stored therein a first floating point instruction and at least one numeric operand, the first floating point instruction specifying a floating point numeric operation and one of a plurality of precisions for the floating point numeric operation;

bus means coupled to said storage means; and processing means coupled to said bus means, said processing means generating a numeric result by performing the floating point numeric operation specified by the first floating point instruction on the at least one numeric operand by converting at least one operand into said one precision using an arithmetic processing means corresponding to the one of a plurality of precisions for the numeric floating point operation specified by the first floating point instruction, said processing means further configured to convert a numeric result to a destination precision defined by a second floating point instruction when the destination precision differs from the precision specified by the first floating point instruction.

* * * * *

UNITED STATES PATENT AND TRADEMARK OFFICE
CERTIFICATE OF CORRECTION

PATENT NO. : 6,108,772
DATED : August 22, 2000
INVENTOR(S) : Sharangpani

It is certified that error appears in the above-identified patent and that said Letters Patent is hereby corrected as shown below:

Title page,
In section [75] Inventors, delete "Harsh" and replace with --Harshvardhan--.

Signed and Sealed this

Twenty-fourth Day of April, 2001

Attest:

NICHOLAS P. GODICI

Attesting Officer

Acting Director of the United States Patent and Trademark Office